United States Patent
Togashi

(10) Patent No.: US 7,495,884 B2
(45) Date of Patent: Feb. 24, 2009

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/882,037

(22) Filed: Jul. 30, 2007

(65) Prior Publication Data

US 2008/0100988 A1    May 1, 2008

(30) Foreign Application Priority Data

Sep. 6, 2006    (JP)    ............................. 2006-241780

(51) Int. Cl.
*H01G 4/228* (2006.01)

(52) U.S. Cl. .............. 361/306.3; 361/306.1; 361/321.1; 361/321.2; 361/302; 361/303

(58) Field of Classification Search ............ 361/306.3, 361/306.1, 321.1, 321.2, 311–313, 302–305, 361/306.2, 308.1
See application file for complete search history.

(56) References Cited

U.S. PATENT DOCUMENTS

| | | | | |
|---|---|---|---|---|
| 5,822,174 | A * | 10/1998 | Yamate et al. | 361/302 |
| 6,191,932 | B1 * | 2/2001 | Kuroda et al. | 361/303 |
| 6,563,689 | B2 * | 5/2003 | Yamamoto | 361/306.1 |
| 6,859,352 | B1 * | 2/2005 | Kanasaki et al. | 361/302 |
| 6,934,145 | B2 * | 8/2005 | Hsieh et al. | 361/321.2 |
| 7,046,500 | B2 * | 5/2006 | Lee et al. | 361/303 |
| 7,050,288 | B2 * | 5/2006 | Ahiko et al. | 361/303 |

FOREIGN PATENT DOCUMENTS

| | | |
|---|---|---|
| JP | U-58-27928 | 8/1981 |
| JP | A 01-206615 | 8/1989 |
| JP | A-4-37005 | 2/1992 |
| JP | A-2006-100708 | 4/2006 |

\* cited by examiner

*Primary Examiner*—Nguyen T Ha
(74) *Attorney, Agent, or Firm*—Oliff & Berridge, PLC

(57) ABSTRACT

A multilayer capacitor has a capacitor element body of a nearly rectangular parallelepiped shape in which a signal electrode layer and a GND electrode layer are laminated with a dielectric layer in between, and signal terminal electrodes and GND terminal electrodes each set of which is provided on either of two side faces along the longitudinal direction of the capacitor element body. A signal electrode is led to each of the two side faces along the longitudinal direction of the capacitor element body and connected to the signal terminal electrodes. First GND electrode and second GND electrode are arranged alongside as spaced in a direction perpendicular to the longitudinal direction of the capacitor element body. The first GND electrode is led to one side along the longitudinal direction of the capacitor element body and connected to the GND terminal electrode. The second GND electrode is led to the other side along the longitudinal direction of the capacitor element body and connected to the GND terminal electrode.

2 Claims, 8 Drawing Sheets

(A)

(B)

DIRECTION OF ELECTRIC CURRENT (A)

(B)

(A)

(B)

MULTILAYER CAPACITOR

BACKGROUND OF THE INVENTION

1. Field of the Invention

The present invention relates to a multilayer capacitor having signal and GND electrodes.

2. Related Background Art

A so-called multilayer feedthrough capacitor used as a noise filter is known as a conventional multilayer capacitor (e.g., cf. Japanese Patent Application Laid-open No. 1-206615). The multilayer feedthrough capacitor described in the Laid-open No. 1-206615 has a laminate body of a nearly rectangular parallelepiped shape consisting of an alternate lamination of dielectric sheets with a signal electrode on each sheet and dielectric sheets with a GND electrode on each sheet, and external electrodes for signal and external electrodes for GND provided on side faces of the laminate body. The signal electrodes are connected to the external electrodes for signal and the GND electrodes are connected to the external electrodes for GND.

SUMMARY OF THE INVENTION

However, the above-described conventional technology had the following problem. Namely, when the multilayer capacitor of the above conventional technology is mounted on a circuit board, the external electrodes for signal are electrically connected to a signal line on the circuit board and the external electrodes for GND are electrically connected to GND lines on the circuit board. For example, in a case where a power supply is connected to one side of the signal line and an IC is connected to the other side of the signal line, noise on the power supply side can interfere with noise on the IC side, so that a voltage variation on either one of the power supply side and the IC circuit side can affect the other.

An object of the present invention is to provide a multilayer capacitor that, when mounted on a circuit board, can remove noise without interference between the noise on the power supply side and the noise on the IC side.

A multilayer capacitor of the present invention is a multilayer capacitor comprising: a capacitor element body of a nearly rectangular parallelepiped shape in which a signal electrode layer and a GND electrode layer are laminated with a dielectric layer in between; and signal terminal electrodes and GND terminal electrodes each set of which is provided on either of two side faces along a longitudinal direction of the capacitor element body; wherein the signal electrode layer has a signal electrode led to each of the two side faces along the longitudinal direction of the capacitor element body and connected to the signal terminal electrodes; wherein the GND electrode layer has first and second GND electrodes arranged alongside as spaced in a direction perpendicular to the longitudinal direction of the capacitor element body; wherein the first GND electrode is led to one side face along the longitudinal direction of the capacitor element body and connected to the GND terminal electrode; and wherein the second GND electrode is led to the other side face along the longitudinal direction of the capacitor element body and connected to the GND terminal electrode.

When the multilayer capacitor of the present invention in this configuration is mounted on a circuit board with a signal line and GND lines thereon, the signal terminal electrodes are electrically connected to the signal line, and the GND terminal electrodes are electrically connected to the GND lines. Since the signal electrode is led to each of the two side faces along the longitudinal direction of the capacitor element body and connected to the signal terminal electrodes, when a signal electric current is allowed to flow through the signal line to the multilayer capacitor, the signal electric current flows in the direction perpendicular to the longitudinal direction of the capacitor element body. Since the first and second GND electrodes are arranged alongside as spaced in the direction perpendicular to the longitudinal direction of the capacitor element body, when the signal electric current is allowed to flow to the multilayer capacitor, the signal electric current flows with a time difference to the first and second GND electrodes. For this reason, the multilayer capacitor functions as an element having two capacitors in terms of an equivalent circuit. Therefore, in a case where a power supply is connected to one side of the signal line and an IC is connected to the other side of the signal line, the apparent power-supply-side capacitor removes noise produced on the power supply side and the apparent IC-side capacitor removes noise produced on the IC side. This allows the multilayer capacitor to remove the noise without interference between the power-supply-side noise and the IC-side noise.

Preferably, a length in the direction perpendicular to the longitudinal direction of the capacitor element body is smaller than a width of a lead portion of the signal electrode. In this case, the resistance is reduced in flow of the signal electric current to the multilayer capacitor, and therefore a large electric current can be made to flow to the multilayer capacitor.

The present invention permits the multilayer capacitor, when mounted on a circuit board, to remove the noise without interference between the power-supply-side noise and the IC-side noise. This can reduce the influence of voltage variation occurring on the power supply side or on the IC side.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the multilayer capacitor according to the present invention will be described below in detail with reference to the drawings. Identical or equivalent elements will be denoted by the same reference symbols, without redundant description.

Figure 1:
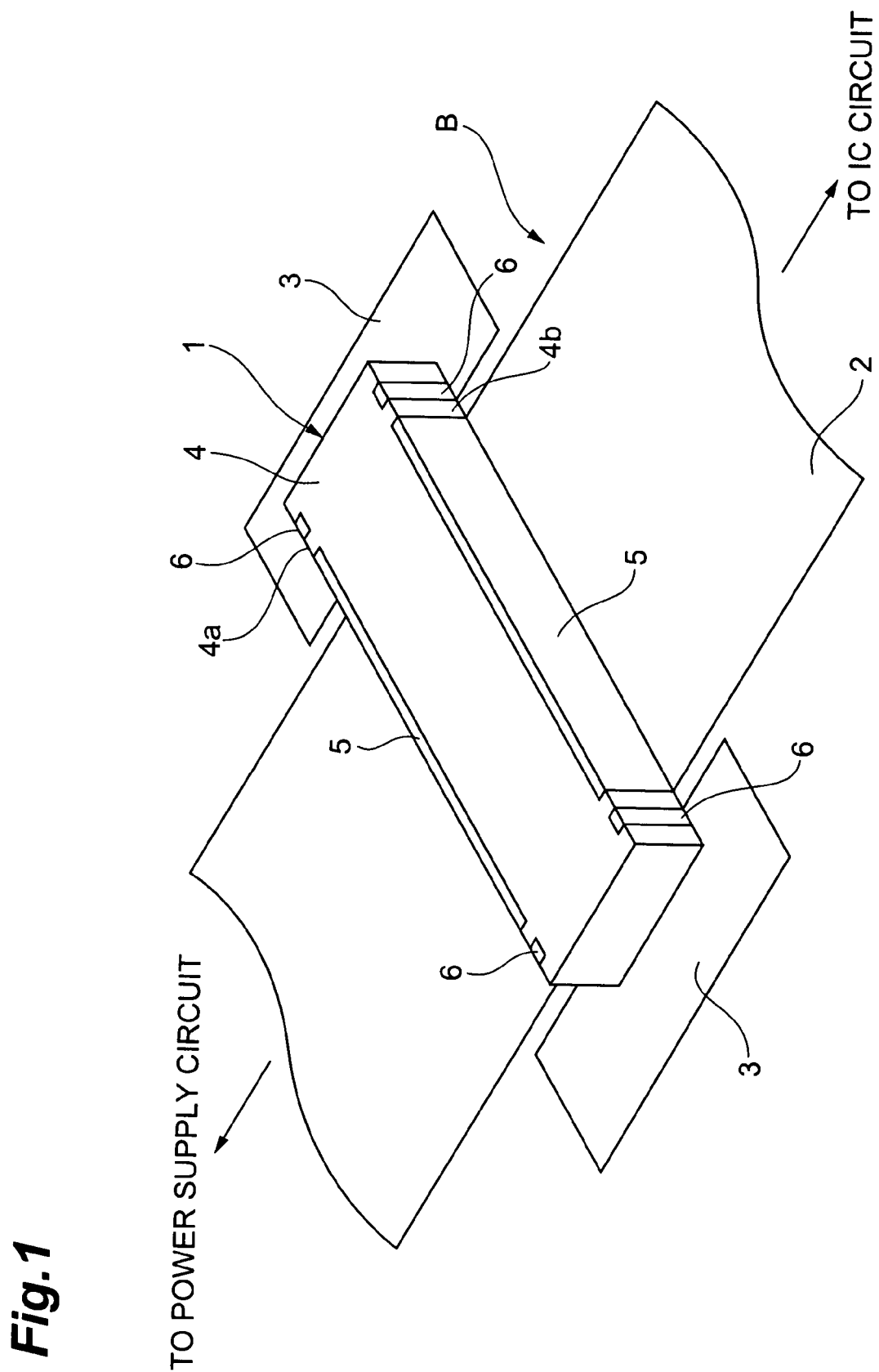
FIG. 1 is a perspective view showing an embodiment of a multilayer capacitor according to an embodiment of the present invention.

FIG. 1 is a perspective view showing an embodiment of the multilayer capacitor according to the present invention. In the same drawing, the multilayer capacitor 1 of the present embodiment is, for example, a three-terminal multilayer feedthrough capacitor used as a noise filter, and is mounted on a circuit board B. A signal line 2 and GND (ground) lines 3 are provided on the circuit board B. A power-supply circuit (not shown) is connected to one side of the signal line 2, and an IC circuit (not shown) is connected to the other side of the signal line 2.

The multilayer capacitor 1 has a capacitor element body 4 of a rectangular parallelepiped (embracing a nearly rectangular parallelepiped as well as a perfect rectangular parallelepiped) shape. There are signal terminal electrodes 5 electrically connected to the signal line 2 on the circuit board B, and GND terminal electrodes 6 electrically connected to the GND lines 3 on the circuit board B, each set of which is provided on either of opposing side faces 4a, 4b along the longitudinal direction of the capacitor element body 4. The signal terminal electrodes 5 are provided one on each of the side faces 4a, 4b of the capacitor element body 4. The GND terminal electrodes 6 are provided two on each of the side faces 4a, 4b of the capacitor element body 4 and with the signal terminal electrode 5 in between.

The signal terminal electrodes 5 and the GND terminal electrodes 6 are not formed only on the side faces 4a, 4b of the capacitor element body 4, but are also formed on portion of the upper face and lower face of the capacitor element body 4. The signal terminal electrodes 5 and GND terminal electrodes 6 are obtained, for example, by forming Ni-plated and Sn-plated layers in order on baked electrode layers of Cu, Ag, or the like.

Figure 2:
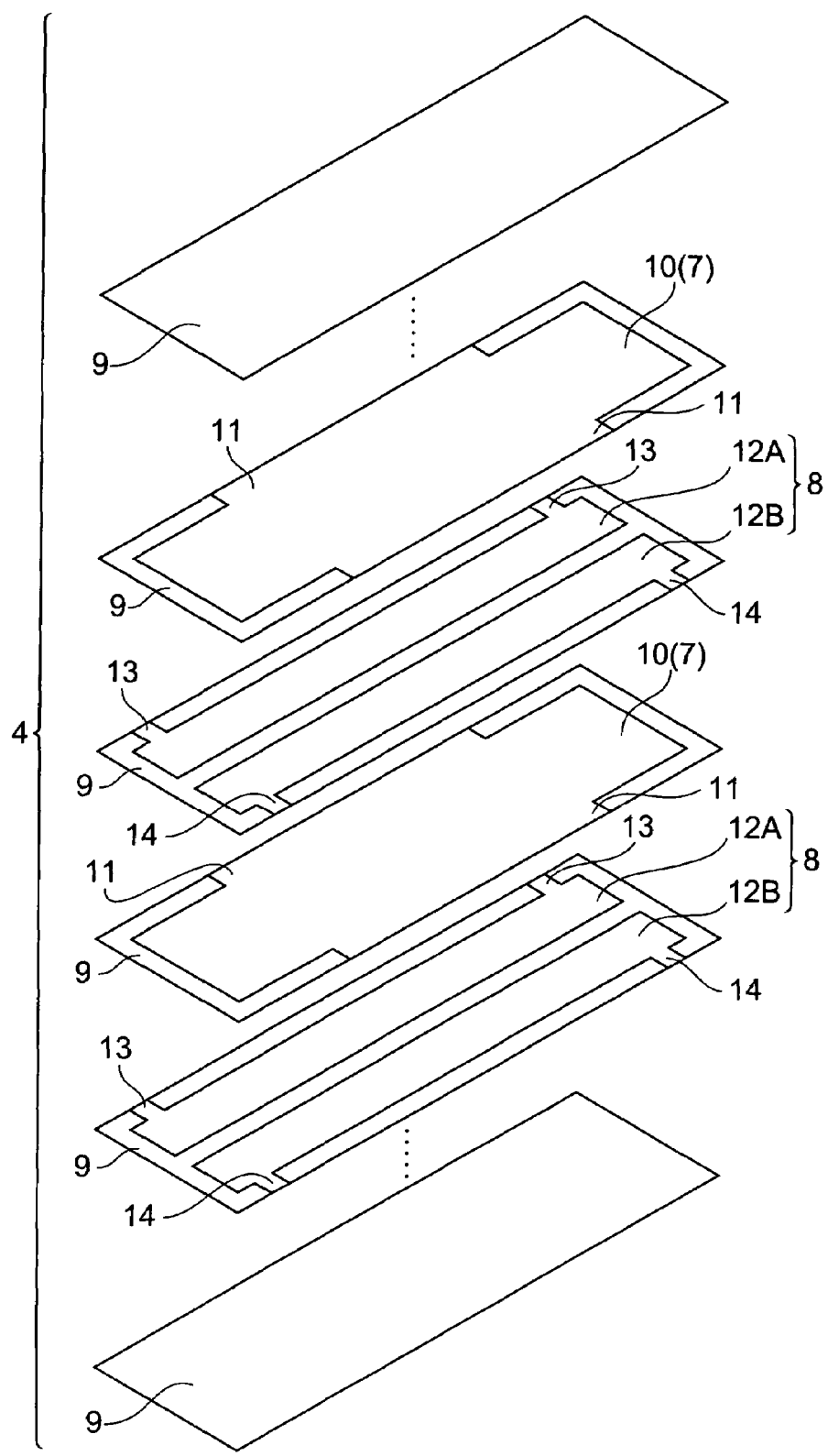
FIG. 2 is an exploded perspective view of a capacitor element body shown in FIG. 1.

The capacitor element body 4, as shown in FIG. 2, has a structure in which a plurality of signal electrode layers 7 and a plurality of GND electrode layers 8 are alternately laminated with a dielectric layer 9 in between. Only a plurality of dielectric layers 9 are laminated in the upper portion and the lower portion of the capacitor element body 4. The dielectric layers 9 are made of a dielectric material, for example, such as a $BaTiO_3$-based ceramic.

Figure 3:
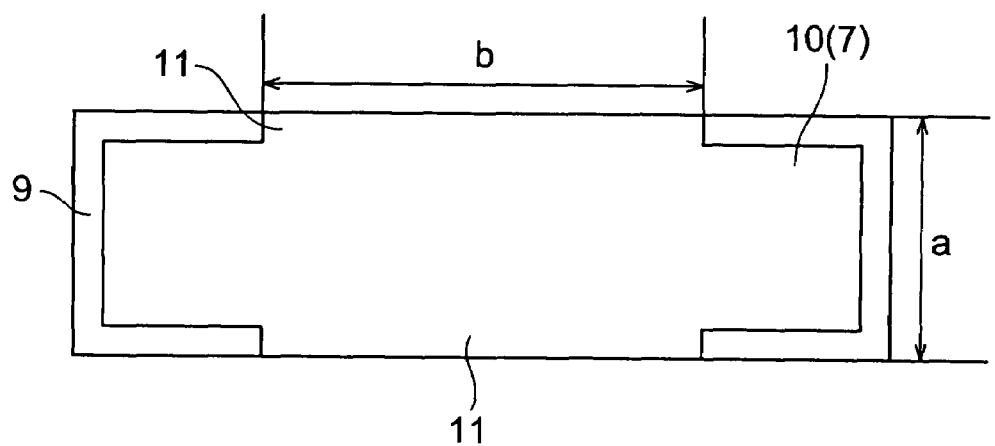
FIG. 3 is a plan view of a signal electrode layer and a GND electrode layer shown in FIG. 2.
Figure 3:
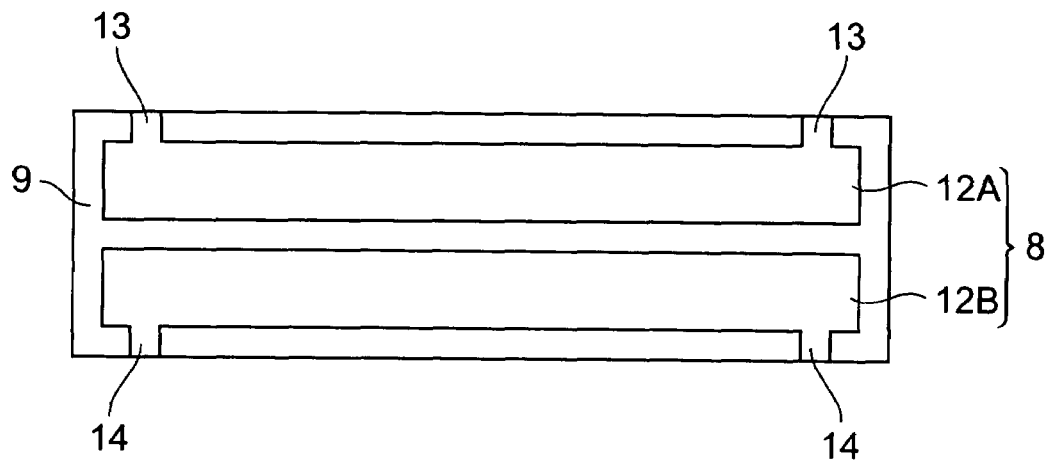

A signal electrode layer 7, as shown in FIG. 2 and FIG. 3(A), is comprised of an internal signal electrode 10 extending along the longitudinal direction of the capacitor element body 4. The internal signal electrode 10 has a pair of lead portions 11 respectively led to areas including the central portion of the side faces 4a, 4b of the capacitor element body 4, and is connected through them to the signal terminal electrodes 5. The internal signal electrode 10 is made, for example, of Ni, a Ni alloy, or the like.

Let "a" be a length in the direction perpendicular to the longitudinal direction of the capacitor element body 4 (which will be referred to hereinafter as a transverse direction of the capacitor element body 4 for convenience' sake), i.e., a length of the signal electrode layer 7 along the transverse direction of the capacitor element body 4, and "b" be a width of the lead portions 11, specifically, a length of the lead portions 11 along the longitudinal direction of the capacitor element body 4. Then the signal electrode layer 7 preferably satisfies the relation of a<b and more preferably satisfies the relation of a<0.7b.

A GND electrode layer 8, as shown in FIG. 2 and FIG. 3(B), is comprised of first and second internal GND electrodes 12A, 12B arranged alongside as spaced in the transverse direction of the capacitor element body 4 and extending along the longitudinal direction of the capacitor element body 4. The first and second internal GND electrodes 12A, 12B are separated from each other with respect to the longitudinal direction of the capacitor element body 4. The first internal GND electrode 12A has two lead portions 13 led to near ends of the side face 4a of the capacitor element body 4 and is connected through them to the GND terminal electrodes 6 provided on the side face 4a. The second internal GND electrode 12B has two lead portions 14 led to areas corresponding to the foregoing lead portions 13 in the side face 4b of the capacitor element body 4 and is connected through them to the GND terminal electrodes 6 provided on the side face 4b. The first and second internal GND electrodes 12A, 12B are made of the same metal as the internal signal electrode 10.

For producing the multilayer capacitor 1 in the configuration as described above, a ceramic paste (dielectric paste) containing ceramic powder of a $BaTiO_3$-based ceramic, an organic binder, and a solvent is first applied onto PET film, for example, by the doctor blade method, to prepare a plurality of green sheets of a rectangular shape which are supposed to become the aforementioned dielectric layers 9. Subsequently, the green sheets are dried, and the internal signal electrodes 10 and the first and second internal GND electrodes 12A, 12B are formed on the upper surfaces of the green sheets, for example, by the screen printing method. Then the green sheets with the internal signal electrode 10 and the green sheets with the first and second internal GND electrodes 12A, 12B are alternately laminated, and a predetermined number of green sheets alone are further laminated thereon, thereby forming a green laminate body. Subsequently, the green laminate body is subjected to press working and then to debindering and firing, thereby obtaining the aforementioned capacitor element body 4. Finally, the signal terminal electrodes 5 and GND terminal electrodes 6 are formed on the side faces 4a, 4b of the capacitor element body 4, for example, by the paste dipping method and electroplating method. The above completes the aforementioned multilayer capacitor 1.

Figure 4:
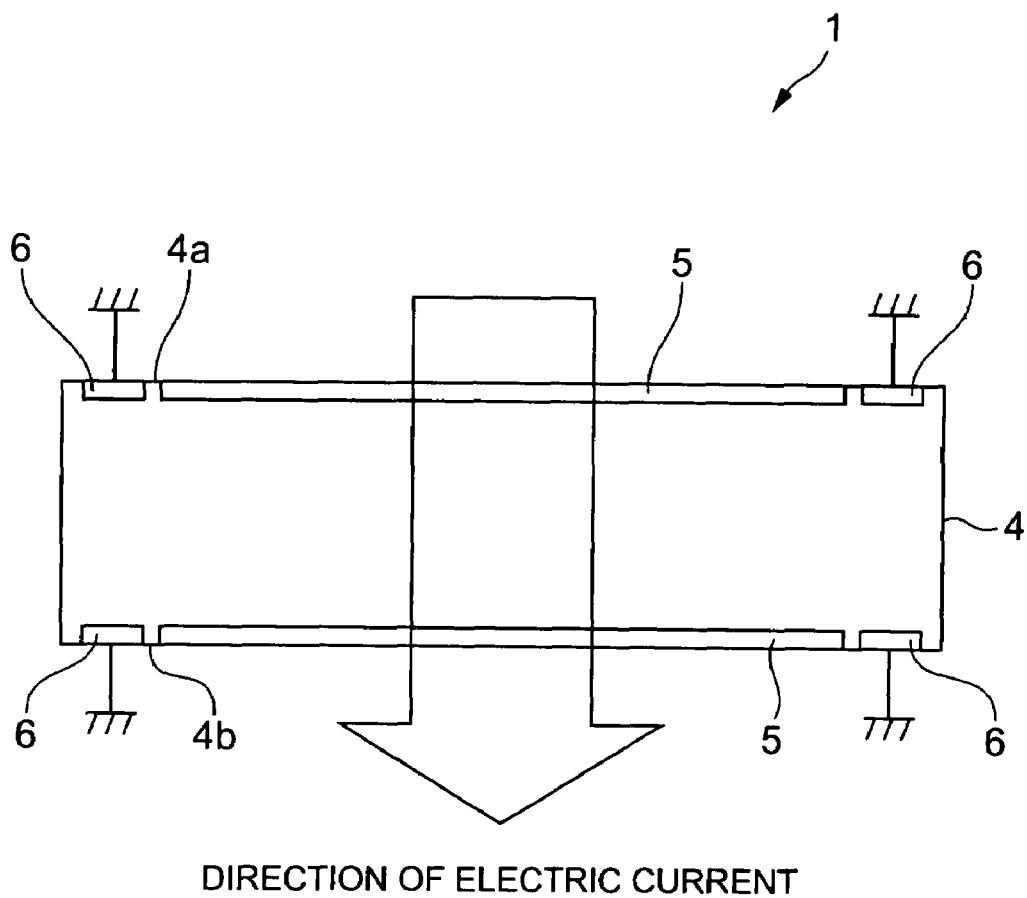
FIG. 4 is a plan view showing a direction of flow of an electric current in the multilayer capacitor shown in FIG. 1.

When a signal electric current is allowed to flow through the signal line 2 on the circuit board B in a state in which the multilayer capacitor 1 as described above is mounted on the circuit board B (cf. FIG. 1), the signal electric current flows in the transverse direction of the capacitor element body 4, as shown in FIG. 4, in the multilayer capacitor 1. At this time, since the length "a" in the transverse direction of the capacitor element body 4 is smaller than the width "b" of the lead portions 11 of the internal signal electrode 10 as described above, the flow path of the signal electric current is short and the resistance is reduced during the flow of the signal electric current. This permits a large electric current to be made to flow to the multilayer capacitor 1.

Then the multilayer capacitor 1 removes noises produced on the power supply circuit side and on the IC circuit side at that time.

Figure 5:
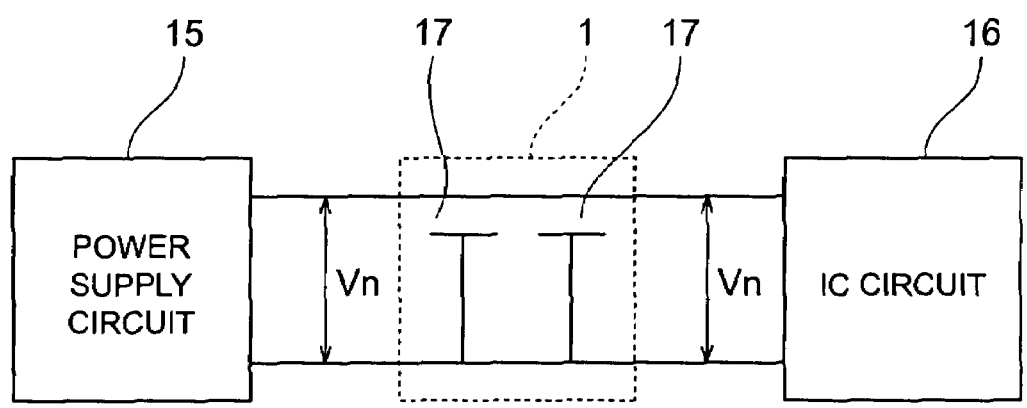
FIG. 5 is an equivalent circuit diagram of a configuration wherein the multilayer capacitor shown in FIG. 1 is mounted on a substrate including a power supply circuit and an IC circuit.

At this time, the first and second internal GND electrodes 12A, 12B forming the GND electrode layer 8 are arranged alongside as spaced in the transverse direction of the capacitor element body 4 (the direction of flow of the signal electric current), as described above. For this reason, there is a time difference between arrival times of the signal electric current at the first and second internal GND electrodes 12A, 12B during the flow of the signal electric current to the multilayer capacitor 1. Therefore, the multilayer capacitor 1 functions as two capacitors consisting of regions where the internal signal electrode 10 overlaps the first and second internal GND electrodes 12A, 12B, in terms of an equivalent circuit. The equivalent circuit of the configuration wherein the multilayer capacitor 1 is mounted on the circuit board B is as shown in FIG. 5. Namely, two capacitors 17 are present in parallel between the power supply circuit 15 and the IC circuit 16.

This causes the multilayer capacitor 1 to separate the noise produced on the power supply circuit 15 side from the noise produced on the IC circuit 16 side. Namely, the capacitor 17 on the power supply circuit 15 side removes the noise produced on the power supply circuit 15 side, and the capacitor 17 on the IC circuit 16 side removes the noise produced on the IC circuit 16 side; therefore, interference (crosstalk) is prevented between the noises. Therefore, for example, even in a case where a voltage variation occurs on the power supply circuit 15 side, the voltage variation is suppressed by the capacitor 17 on the power supply circuit 15 side. As a result, the IC circuit 16 is rarely affected by the voltage variation on the power supply circuit 15 side.

Figure 6:
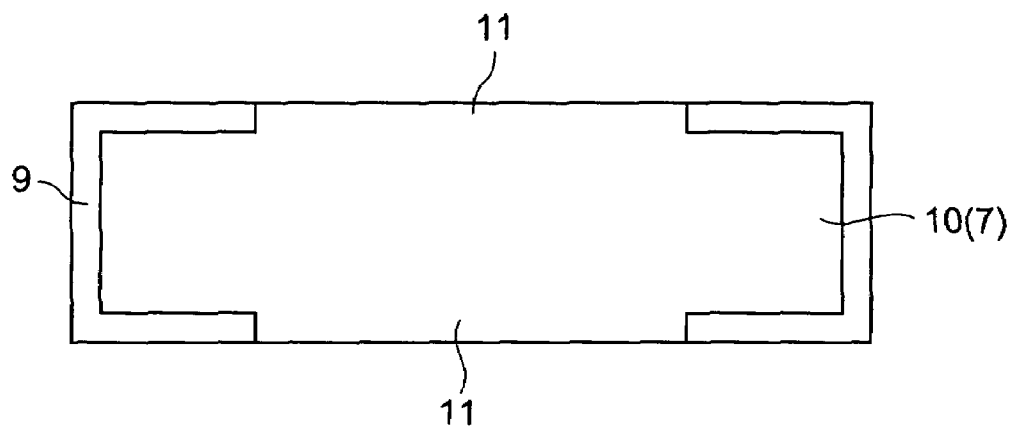
FIG. 6 is a plan view showing a GND electrode layer and a signal electrode layer as a comparative example.
Figure 6:
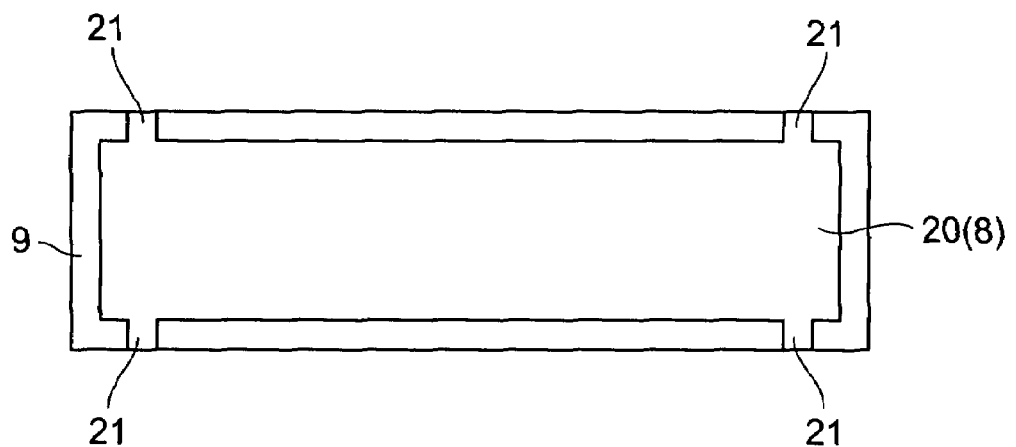

A GND electrode layer as a comparative example is shown in FIG. 6. As shown in FIG. 6(B), the GND electrode layer 8 is composed of an internal GND electrode 20 different from the separate structure. The internal GND electrode 20 has two pairs of lead portions 21 respectively led to near the ends of the side faces 4a, 4b of the capacitor element body 4. The signal electrode layer 7 shown in FIG. 6(A) has the same structure as that shown in FIG. 3(A).

Figure 7:
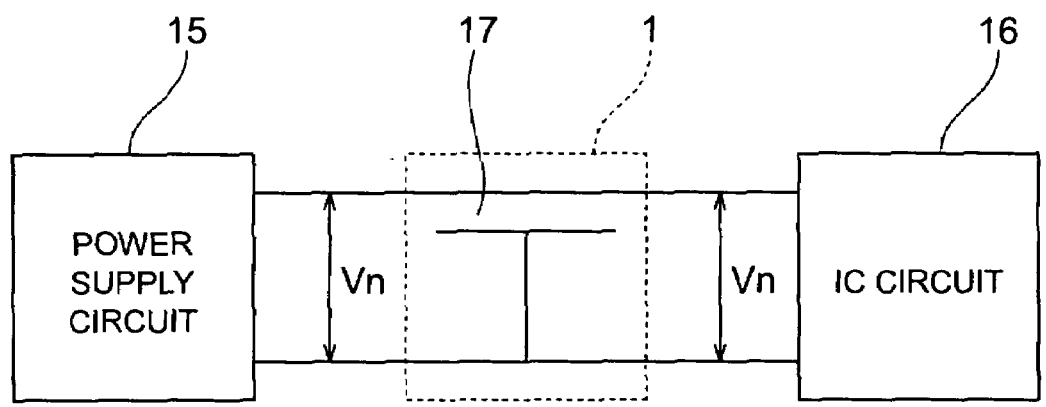
FIG. 7 is an equivalent circuit diagram of a configuration wherein the multilayer capacitor with the signal and GND electrode layers shown in FIG. 6 is mounted on a substrate including a power supply circuit and an IC circuit.

An equivalent circuit of the configuration wherein the multilayer capacitor 1 with the signal electrode layers 7 and GND electrode layers 8 as shown in FIG. 6 is mounted on the circuit board B, is as shown in FIG. 7. Namely, only one capacitor 17 is present between the power supply circuit 15 and the IC circuit 16. In this case, when a signal electric current is allowed to flow through the signal line 2 of the circuit board B, interference occurs between the noise on the power supply circuit 15 side and the noise on the IC circuit 16 side, and the voltage variation occurring on the power supply circuit 15 side can affect the IC circuit 16.

Figure 8:
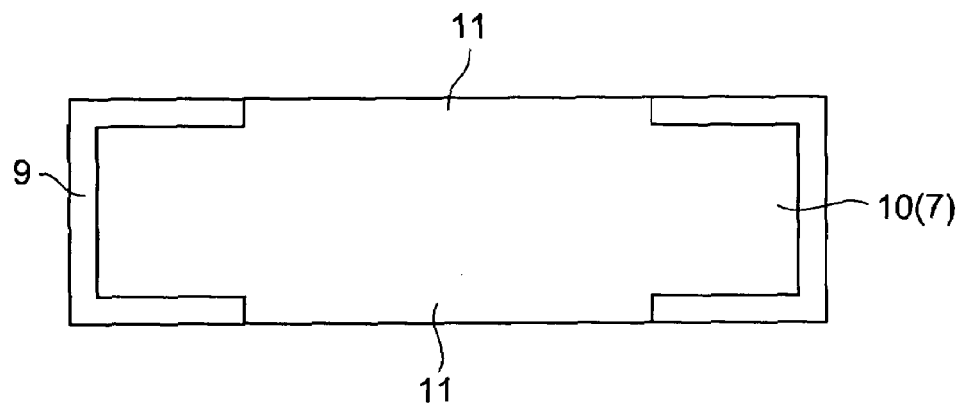
FIG. 8 is a plan view showing a GND electrode layer and a signal electrode layer as another comparative example.
Figure 8:
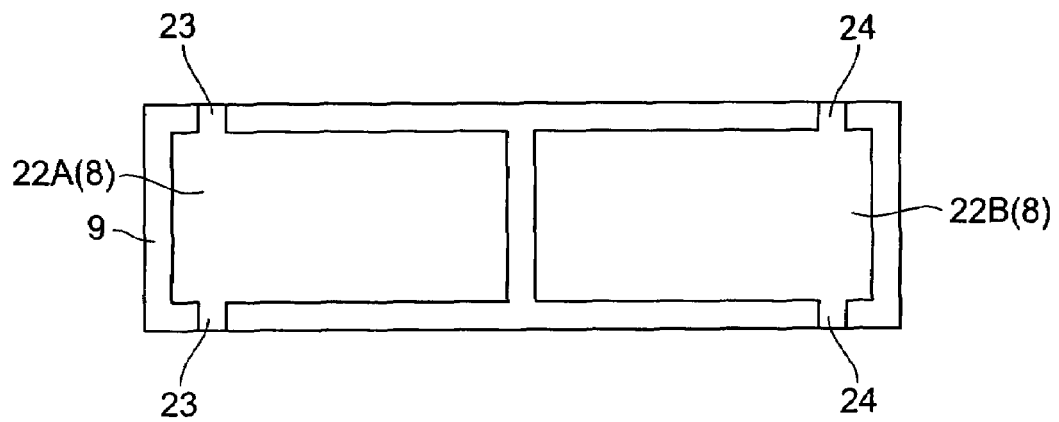

A GND electrode layer as another comparative example is shown in FIG. 8. As shown in FIG. 8(B), the GND electrode layer 8 is composed of first and second internal GND electrodes 22A, 22B arranged alongside as spaced in the longitudinal direction of the capacitor element body 4. Namely, the first and second internal GND electrodes 22A, 22B are separated from each other with respect to the transverse direction of the capacitor element body 4. The first internal GND electrode 22A has a pair of lead portions 23 each led to near one end of the side faces 4a, 4b of the capacitor element body 4. The second internal GND electrode 22B has a pair of lead portions 24 each led to near the other end of the side faces 4a, 4b of the capacitor element body 4. The signal electrode layer 7 shown in FIG. 8(A) has the same structure as that shown in FIG. 3(A).

When a signal electric current is allowed to flow through the signal line 2 on the circuit board B in a state in which the multilayer capacitor 1 with the signal electrode layers 7 and GND electrode layers 8 as shown in FIG. 8 is mounted on the circuit board B, the signal electric current flows simultaneously (without time difference) to the first and second internal GND electrodes 22A, 22B. Therefore, though there are two internal GND electrodes in the same layer, they are regarded as one capacitor in terms of an equivalent circuit. Namely, the equivalent circuit in this case is as shown in FIG. 7. Therefore, the above configuration results in inducing interference between the noise on the power supply circuit 15 side and the noise on the IC circuit 16 side.

Since the multilayer capacitor 1 of the present embodiment, as described above, has the structure in which the internal GND electrode forming each GND electrode layer 8 is divided into two parts along the longitudinal direction of the capacitor element body 4, when the signal electric current is allowed to flow in the mounted state of the multilayer capacitor 1 on the circuit board B, the multilayer capacitor is able to remove the noises on the power supply circuit 15 side and on the IC circuit 16 side, without interference between them. This enables achievement of reduction in the voltage variation.

It is noted that the present invention is by no means intended to be limited to the above embodiment. For example, the shapes of the internal signal electrodes and internal GND electrodes, the locations and the numbers of the lead portions of the internal signal electrodes and the internal GND electrodes, etc. do not have to be limited, particularly, to those in the above embodiment.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
   a capacitor element body of a nearly rectangular parallelepiped shape in which a signal electrode layer and a GND electrode layer are laminated with a dielectric layer in between; and
   signal terminal electrodes and GND terminal electrodes each set of which is provided on either of two side faces along a longitudinal direction of the capacitor element body;
   wherein the signal electrode layer has a signal electrode led to each of the two side faces along the longitudinal direction of the capacitor element body and connected to the signal terminal electrodes;
   wherein the GND electrode layer has first and second GND electrodes separated from each other and arranged alongside as spaced in a direction perpendicular to the longitudinal direction of the capacitor element body;
   wherein the first GND electrode is led to one side face along the longitudinal direction of the capacitor element body and connected to the GND terminal electrode; and
   wherein the second GND electrode is led to the other side face along the longitudinal direction of the capacitor element body and connected to the GND terminal electrode.

2. The multilayer capacitor according to claim 1,
   wherein a length in the direction perpendicular to the longitudinal direction of the capacitor element body is smaller than a width of a lead portion of the signal electrode.

* * * * *